United States Patent [19]

Torii et al.

[11] Patent Number: 5,727,423
[45] Date of Patent: Mar. 17, 1998

[54] CONNECTION STRUCTURE OF A DISTRIBUTION CORD USED FOR A SHIFT LEVER

[75] Inventors: Yasuo Torii; Masao Aoyagi, both of Tokyo, Japan

[73] Assignee: Niles Parts Co., Ltd., Tokyo, Japan

[21] Appl. No.: 676,721

[22] Filed: Jul. 8, 1996

[30] Foreign Application Priority Data

Aug. 7, 1995 [JP] Japan .................... 7-221077

[51] Int. Cl.$^6$ .................................... F16H 59/04
[52] U.S. Cl. ................... 74/473 R; 74/335; 74/475; 200/61.88; 439/34
[58] Field of Search ................ 74/335, 473 R, 74/475; 200/61.88; 439/34

[56] References Cited

U.S. PATENT DOCUMENTS 5,247,849  9/1993  Sato ........................... 74/475
5,345,836  9/1994  Yokoyama et al. ............. 74/473 R

FOREIGN PATENT DOCUMENTS 1-120223  8/1989  Japan .
5-5324    2/1993  Japan .

Primary Examiner—Allan D. Herrmann
Attorney, Agent, or Firm—Ronald P. Kananen

[57] ABSTRACT

A connection structure connecting an end of a distribution cord on a shift lever to an end of a distribution cord on a device main body. The connection structure provides electric conduction, for example, with a switch disposed on a control knob of a shift change lever device. The structure includes a control knob having a grip portion and a switch or the like disposed on the control knob. The control knob is securely connected and integrated by axial fitting to the upper end of a driving base pivoted swingably at a lower end. A conducting flange is molded integrally with the driving base near an upper end of the driving base. Connecting conductor male terminals protrude from a lower end of the grip portion and are electrically connected with the switch. Connecting conductor female terminals are fitted into the conducting flange at respective positions opposing to the connecting conductor male terminals and are connected with the distribution cord on the device main body.

11 Claims, 3 Drawing Sheets

CONNECTION STRUCTURE OF A DISTRIBUTION CORD USED FOR A SHIFT LEVER

BACKGROUND OF THE INVENTION

1. Field of the Invention

The present invention relates generally to shift change levers and, in particular, an improvement in shift change lever devices used for automatic transmission cars. More particularly, the present invention relates to an improvement in a connection structure of a distribution cord used for a shift lever to provide electrical conductive connection between an end of the distribution cord on a device main body and a switch disposed on a control knob.

2. Description of the Related Art

Automatic transmissions of cars in recent years are generally provided with an overdrive switch (hereinafter referred to as "OD switch") for switching to a running mode to improve the vehicle fuel economy and to reduce costs during operation of the vehicle under light load. A connection structure is generally provided for connecting the OD switch to a distribution cord on a device main body. The OD switch is disposed on a control knob of a shift change lever device. The connection structure adopted in this related device comprises either a soldered connection (refer, for example, to Japanese Utility Model Publication Hei 5-5324) or a connector connection (refer, for example, to Japanese Utility Model Laid Open Publication Hei 1-120223).

However, there are problems associated with these related connection structures. In the soldered connection, since an inner tract of the shift lever provided with the OD switch is narrow, extension of the distribution cord is difficult. Moreover, the control knob is very difficult to assemble as a result of the additional connection step required to solder the OD switch to the distribution cord on the main body. Further, since the distribution cord is connected from the device main body by way of a driving portion to the control knob, there is a risk that the distribution cord will be disconnected by metal fatigue and thereby cause an accident.

In view of the above problems associated with the soldered connection, a connector connection was developed, as shown in FIG. 6. The connector connection shown in FIG. 6 has a structure that provides an electric conduction to an OD switch 51 disposed on a control knob 50. A connector male member 55 and a connector female member 56 are connected, respectively, to an end of a distribution cord 52 on a control knob and an end of a distribution cord 54 on a shift change lever device main body 53. Both of the connectors 55 and 56 are connected in a separate assembly step after assembling the control knob 50.

The structure of this type using the connectors 55 and 56 requires an inner tract in the control knob 50 for housing the connectors. The inner tract imposes a restriction on the design, and increases the number of parts and assembling steps, thereby raising the production cost and resulting in economical disadvantages.

SUMMARY OF THE INVENTION

An object of the present invention is to solve the problems associated with the above-described related connection structures.

More specifically, it is an object of the present invention to provide a connection structure for distribution cords used for a shift lever, capable of extending distribution cords irrespective of the structure of a control knob, requiring neither space for soldering work nor an inner tract for housing connectors, and capable of minimizing the number of assembling steps to reduce the production cost.

It is a further object of the present invention to provide a connection structure of a distribution cord for a shift lever having excellent operability and a structure capable of connecting and disconnecting distribution cords simultaneously with an attachment and detachment of a control knob, such as during an exchange of the control knob for maintenance.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

To overcome the problems associated with the prior art, and in accordance with an aspect of the present invention, there is provided a connection structure of distribution cords for a shift lever to provide conductive connection between an end of a distribution cord of a shift lever and an end of a distribution cord on a device main body for electric conduction, for example, with a switch disposed on a control knob of a shift change lever device, the connection structure comprising:

- a control knob comprising a grip portion and a switch disposed on the control knob, the control knob being securely connected by an axial fitting of the control knob to an upper end of a driving base, the driving base having a lower end that is pivoted swingably;
- a conducting flange molded integrally with the driving base near an upper end of the driving base;
- connecting conductor male terminals that protrude from a lower end of the grip portion, the male terminals being electrically connected with the switch; and
- connecting conductor female terminals fitted into the conducting flange at respective positions opposing to the connecting conductor male terminals, the female terminals being connected with the distribution cord on the device main body.

In a preferred embodiment of the present invention, the conducting flange comprises a pair of terminal insertion holes extending from an upper end surface of the conducting flange to a lower end surface of the conducting flange, each insertion hole having a cord insertion slit extending from a wall of the conducting flange between the upper and lower end surfaces to a central portion of the insertion hole, and the female terminals are inserted and contained in the terminal insertion holes.

In accordance with another aspect of the present invention, there is provided a shift change lever assembly comprising a control knob with a grip portion and an electric switch, a driving base having a lower end for pivotally mounting the driving base and an upper end, the control knob being connected to the upper end of the driving base by axially sliding the control knob over the upper end, the driving base having an integrally molded conducting flange, connecting conductor male terminals fixed to the grip portion and extending downwardly from the grip portion, the male terminals being electrically connected to the switch, and connecting conductor female terminals fitted into the conducting flange at respective positions in alignment with the connecting conductor male terminals, the female terminals being electrically connected with a distribution cord, whereby the male terminals are inserted into the female terminals to form a completed electrical connection from the switch to the distribution cord upon axially sliding the control knob over the upper end of the driving base.

The conducting flange preferably comprises a pair of terminal insertion holes extending from an upper end surface of the conducting flange to a lower end surface of the conducting flange. Each insertion hole has a cord insertion slit extending from a wall of the conducting flange between the upper and lower end surfaces to a central portion of the insertion hole, and the female terminals are inserted and contained in the terminal insertion holes. The control knob comprises a lower end surface from which the male terminals extend downwardly, the lower end surface of the control knob facing the upper end surface of the driving base when the male terminals are received in the female terminals. The control knob also comprises an internal bore extending axially within the control knob, the internal bore being open at the lower end surface of the control knob.

The driving base preferably comprises a selector lever portion extending upwardly from the conducting flange and being axially received within the internal bore of the control knob. The conducting flange comprises an upper end surface facing the lower end surface of the control knob, the conducting flange having terminal insertion holes extending through the conducting flange in a direction parallel to an axial direction of the internal bore and an axial direction of the selector lever portion, and the female terminals being secured in the terminal insertion holes, whereby the male terminals are aligned and inserted into the female terminals upon sliding the control knob over the selector lever portion. Cord insertion slits are formed in the conducting flange and are dimensioned such that the distribution cord can be passed through the cord insertion slits during assembly.

The female terminals preferably each have an enlarged head portion, the enlarged head portion having a larger diameter than a diameter of the terminal insertion holes, whereby the enlarged head portions engage the upper surface of the conducting flange to prevent the female terminals from sliding therethrough. The upper surface of the conducting flange comprises a recessed portion for accommodating the enlarged head portions of the female terminals.

In the structure described above, the distribution cord on the control knob and the distribution cord on the main body are electrically connected by a fitting structure between the connecting conductor male terminal and the connecting conductor female terminal constituted in the conducting flange. Accordingly, when the grip portion of the control lever and the driving base are connected and assembled, electric connection, for example, with a switch disposed to the control knob is conducted simultaneously.

In addition, since other parts such as connectors are not used and operations such as soldering and detachment are not required, an inner tract for containing connectors to the control knob can be eliminated and operation space for soldering can be saved.

BRIEF DESCRIPTION OF THE DRAWINGS

The present invention will become more clearly appreciated as a description of the invention is made with reference to the accompanying drawings. In the drawings.

DETAILED DESCRIPTION OF THE PREFERRED EMBODIMENT

Figure 1:
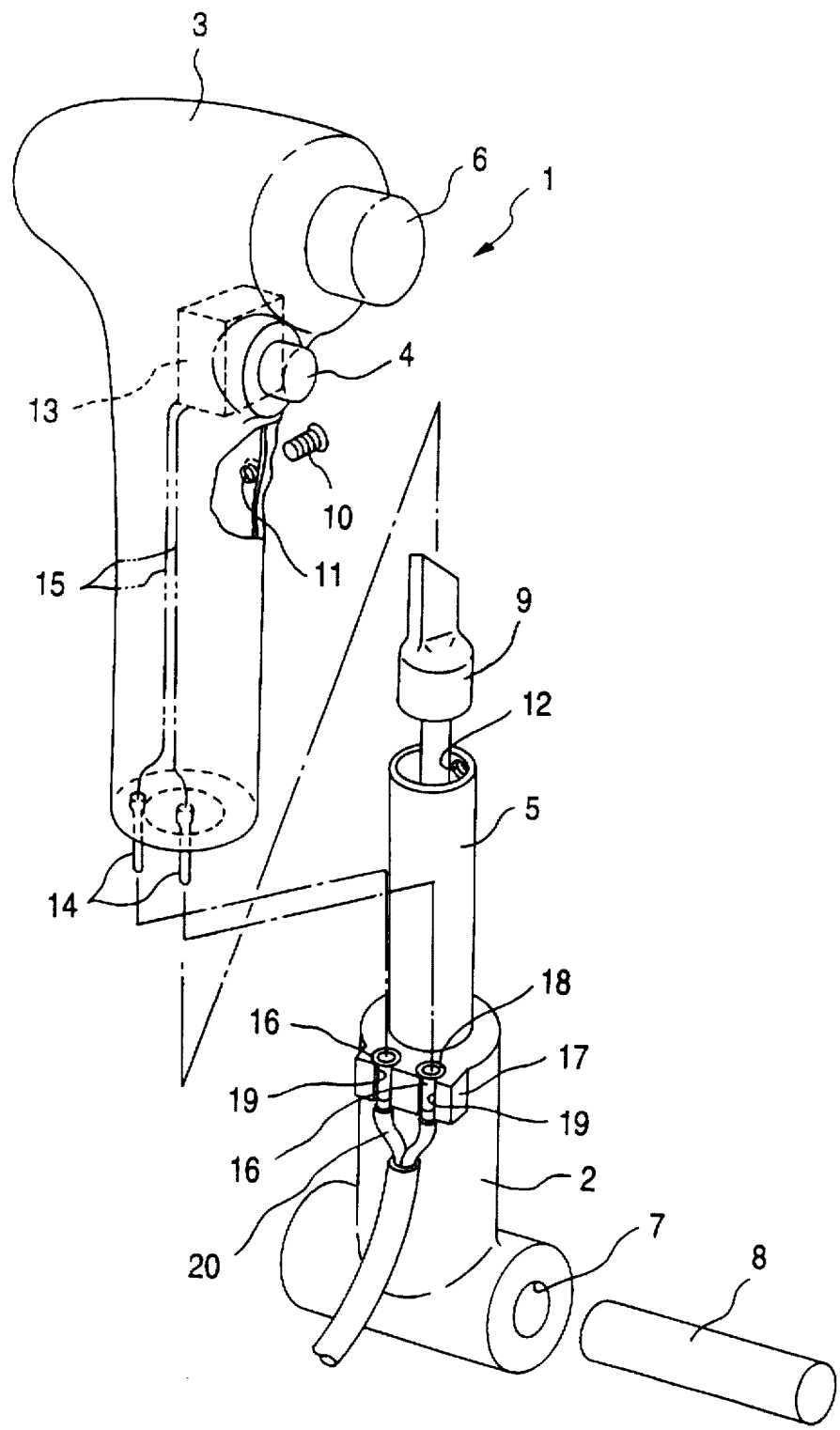
FIG. 1 is a perspective schematic view partially in cross section of a control knob with a grip portion being separated for illustrating a preferred embodiment of a connection structure for distribution cords used in a shift lever according to the present invention.

Description of a preferred embodiment of a connection structure of distribution cords used for a shift lever according to the present invention will be made with reference to FIGS. 1 through 5.

In a shift change lever device of an automatic transmission (not illustrated) to be mounted on an automatic car, a control knob 1 is pivoted swingably at the lower end of a driving base 2 to a main body device, and an OD switch changing button 4 is disposed near the top end of a grip portion 3.

The grip portion 3 is integrated with the driving base 2 by externally fitting the lower end thereof over a cylindrical selector lever 5 protruded from the shaft end of the driving base 2, and a shift lock button 6 is disposed to the top end of the grip portion 3 for switchingly driving the shift lever changing device.

The driving base 2 to be integrated with the selector lever 5 has a swinging shaft hole 7 perforated integrally in the lower end in a direction perpendicular to a longitudinal direction of the lever 5. A support shaft 8 transversely disposed and secured to the main body is inserted into the hole 7 to pivotally support the driving base 2 to the main body. A shift lock rod 9 has a link structure interfering at an inner end to a engagement control groove (not illustrated) of the support shaft 8, interfering at a top end to the inner end of the shift lock button 6, and enabling switching driving of the shift change device. The rod 9 is inserted into the selector lever 5 protruded from the end of the driving base 2.

Further, at the back of the grip portion 3, a screw insertion hole 11 is perforated for inserting a setting screw 10. The selector lever 5 has a threaded hole 12 formed at a position corresponding to the screw insertion hole 11 for screw-coupling with the setting screw 10. The setting screw 10 inserted through the screw insertion hole 11 is integrated with the screw hole 12 by screw coupling and clamping.

An OD switch 13 integral with the OD switch changing button 4 and incorporated in the grip portion 3 has a structure connected electrically with connecting conductor male terminals 14, 14 by way of a control knob distribution cord 15 disposed within the wall of the grip portion 3. The terminals 14, 14 are formed integrally with the grip portion 3 so that terminal ends of both electrodes protrude from the lower end of the grip portion 3. The control knob distribution cord 15 is insert-molded in the control knob 1. The connecting conductor male terminals 14, 14 and the control knob distribution cord 15 may be integrally made of fine rod wires.

Connecting conductor female terminals 16, 16 are fit into and secured to a conducting flange 17 molded by radial protrusion at the upper end of the driving base 2. The female terminals 16, 16 have a structure for connecting with the end of a main body distribution cord 20 from the main body device of the shift change lever device, and for connection with the connecting conductor male terminals 14, 14.

The conducting flange 17 has a pair of terminal insertion holes 18, 18 capable of receiving the connecting conductor female terminals 16, 16 from the upper end surface in positions corresponding to the positions of the connecting conductor male terminals 15, 15. The conducting flange 17 also has cord insertion slits 19, 19 extending to the central portion of the bottom wall of both terminal insertion holes 18, 18. The conducting flange 17 is formed so as to have a space capable of inserting the lateral portion of the main body distribution cord 20 to the front wall.

Figure 5:
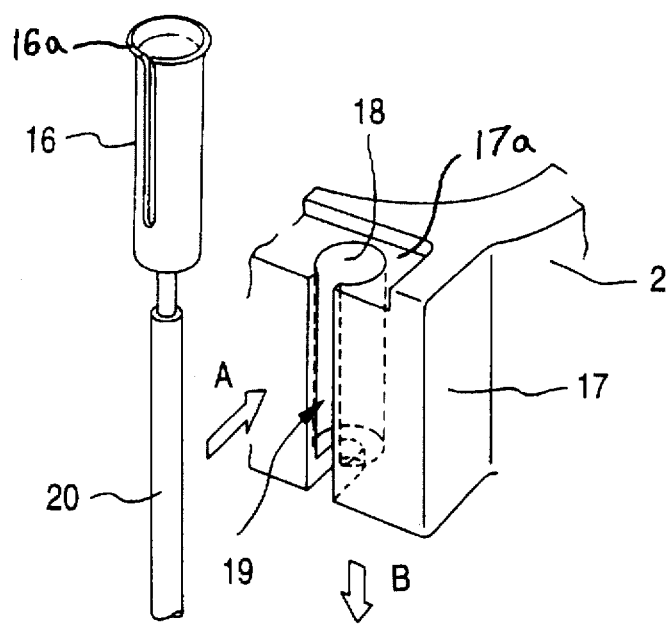
FIG. 5 is an explanatory view illustrating the fitting relationship between a conducting flange and a connecting conductor female terminal.
Figure 6:
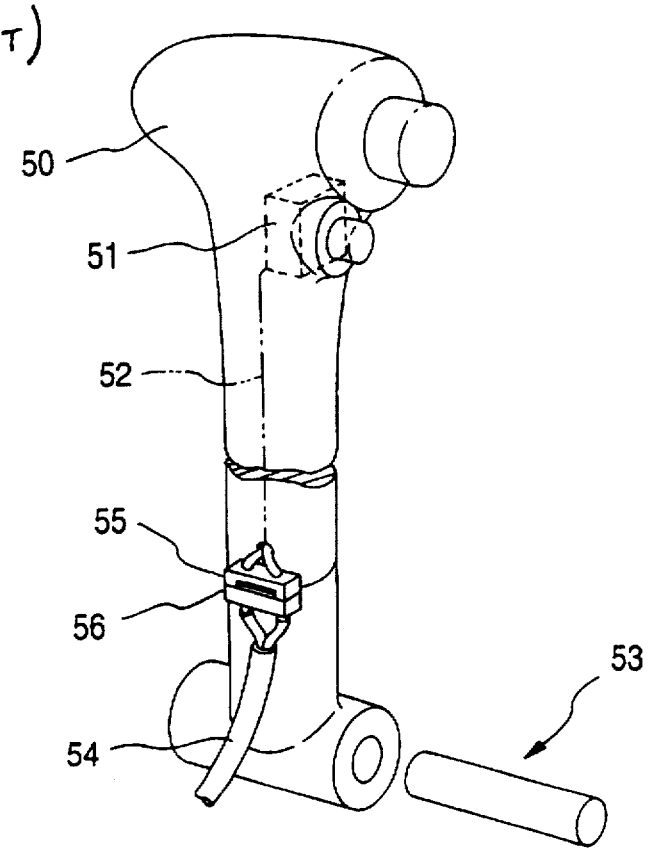
FIG. 6 is a schematic structural view of a control knob illustrating a conventional connection structure of distribution cords used for a shift lever.

The connecting conductor female terminals 16, 16 previously connected to the end of the main body distribution cord 20 are each advanced at the cord portion from the cord insertion slit 19 (along arrow A, as shown in FIG. 5), then drawn toward the cord (arrow B) and inserted and contained in a respective terminal insertion hole 18. When the connecting conductor female terminals 16, 16 are contained in the terminal insertion holes 18, 18, the female terminals 16, 16 are opposed to the connecting conductor male terminals 14, 14. When the lower end of the grip portion 3 is fitted externally over the selector lever 5, the terminal ends of the connecting conductor male terminals 14, 14 protruded from the lower end of the grip portion 3 are inserted into both connecting conductor female terminals 16, 16, respectively, to provide a structure of electrically connecting the control knob distribution cord 15 and the main body distribution cord 20.

Figure 2:
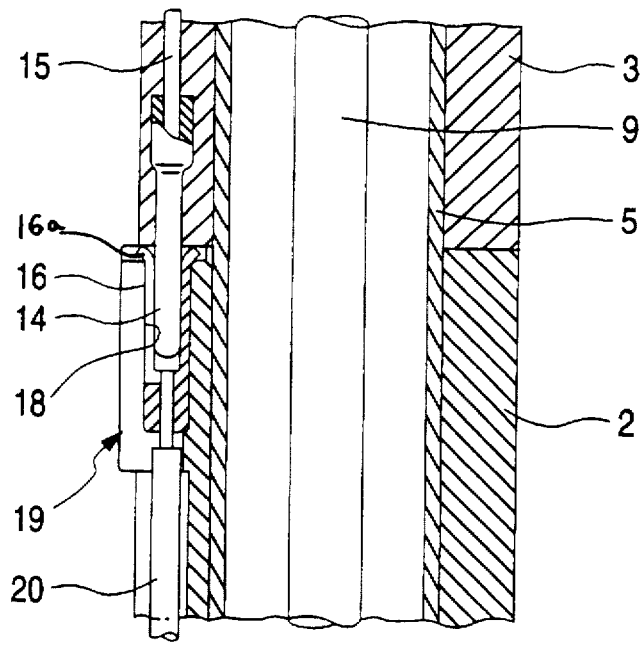
FIG. 2 is a partially cut away vertical cross sectional view, enlarged for showing a joining portion between a driving base and a grip portion.
Figure 3:
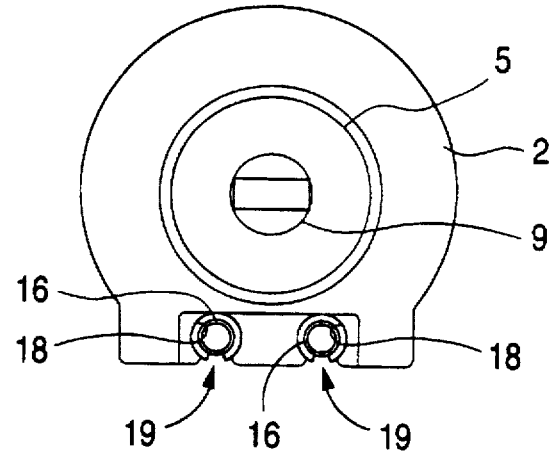
FIG. 3 is an end view for the top end of the driving base.
Figure 4:
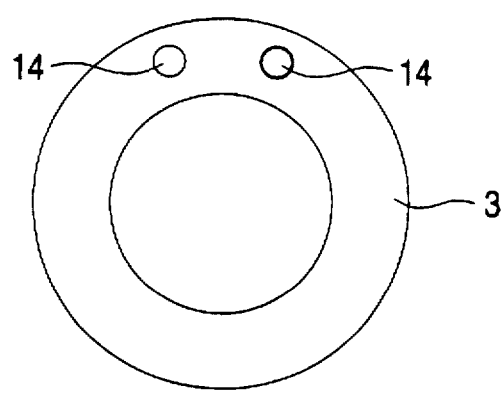
FIG. 4 is an end view for the lower end of the grip portion.

As shown in FIGS. 2 and 5, the upper ends of the female terminals 16, 16 have enlarged head portions 16a. The head portions 16a have a larger outer diameter than an inside diameter of the terminal insertion holes 18. Thus, the enlarged head portions 16a engage the upper surface of the conducting flange 17 to prevent the female terminals 16, 16 from sliding therethrough. The upper surface of the conducting flange 17 comprises a recessed portion 17a for accommodating the enlarged head portions 16a of the female terminals 16, 16.

In the connection structure of distribution cords for a shift lever according to the present invention, since the control knob distribution cord and the main body distribution cord are connected electrically by a fitting mechanism connecting the connecting conductor male terminals and the connecting conductor female terminals constituted to the conducting flange, the electric connection is conducted simultaneously when the grip portion of the control lever and the driving base are connected and assembled. Accordingly, the distribution cord can be connected or disconnected easily to improve the operability during assembly and maintenance.

Further, since other parts, such as connectors or solder, are not used in the structure of the present invention, various advantages are obtainable. For example, the number of parts can be reduced thereby lowering the production cost. In addition, an inner tract for connecting the connectors can be eliminated, operation space for soldering can be saved, and the degree of freedom can be ensured in the design of the control knob. The present invention has an excellent effect upon practice.

It will be appreciated that the present invention is not limited to the exact construction that has been described above and illustrated in the accompanying drawings, and that various modifications and changes can be made without departing from the scope and spirit thereof. It is intended that the scope of the invention protected only be limited by the appended claims.

What is claimed is:

1. A connection structure for providing conductive connection between an end of a distribution cord on a shift lever and an end of a distribution cord on a device main body, the connection structure comprising:

a control knob comprising a grip portion and a switch, said control knob being securely connected by an axial fitting of the control knob to an upper end of a driving base, said driving base having a lower end that is pivoted swingably;

a conducting flange molded integrally with the driving base near an upper end of the driving base;

connecting conductor male terminals that protrude from a lower end of the grip portion, said male terminals being electrically connected with said switch; and connecting conductor female terminals fitted into the conducting flange at respective positions opposing to the connecting conductor male terminals, said female terminals being electrically connected with the distribution cord on the device main body;

wherein said conducting flange comprises a pair of terminal insertion holes extending from an upper end surface of the conducting flange to a lower end surface of the conducting flange, each insertion hole having a cord insertion slit extending from a wall of the conducting flange between the upper and lower end surfaces to a central portion of the insertion hole, and the female terminals are inserted and contained in said terminal insertion holes.

2. The connection structure according to claim 1, wherein said switch is an overdrive switch for an automatic transmission.

3. A shift change lever assembly, comprising:

a control knob comprising a grip portion and an electric switch;

a driving base having a lower end for pivotally mounting the driving base and an upper end, said control knob being connected to said upper end of the driving base by axially sliding said control knob over said upper end, said driving base having an integrally molded conducting flange;

connecting conductor male terminals fixed to said grip portion and extending downwardly from said grip portion, said male terminals being electrically connected to said switch; and connecting conductor female terminals fitted into said conducting flange at respective positions in alignment with said connecting conductor male terminals, said female terminals being electrically connected with a distribution cord, whereby said male terminals are inserted into said female terminals to form a completed electrical connection from said switch to said distribution cord upon axially sliding said control knob over said upper end of the driving base;

wherein said conducting flange comprises a pair of terminal insertion holes extending from an upper end surface of the conducting flange to a lower end surface of the conducting flange; and wherein each insertion hole has a cord insertion slit extending from a wall of the conducting flange between the upper and lower end surfaces to a central portion of the insertion hole, and the female terminals are inserted and contained in said terminal insertion holes.

4. The shift change lever assembly according to claim 3, wherein said switch is an overdrive switch for an automatic transmission.

5. The shift change lever assembly according to claim 3, wherein said control knob comprises a lower end surface from which said male terminals extend downwardly, said lower end surface of the control knob facing said upper end surface of said driving base when said male terminals are received in said female terminals.

6. The shift change lever assembly according to claim 3, wherein said control knob comprises a lower end surface from which said male terminals extend downwardly and an internal bore extending axially within said control knob, said internal bore being open at the lower end surface of said control knob.

7. The shift change lever assembly according to claim 6, wherein said driving base comprises a selector lever portion extending upwardly from said conducting flange and being axially received within said internal bore of said control knob.

8. The shift change lever assembly according to claim 7, wherein said conducting flange comprises an upper end surface facing said lower end surface of said control knob, said conducting flange having terminal insertion holes extending through said conducting flange in a direction parallel to an axial direction of said internal bore and an axial direction of said selector lever portion, and said female terminals being secured in said terminal insertion holes, whereby said male terminals are aligned and inserted into said female terminals upon sliding said control knob over said selector lever portion.

9. A shift change lever assembly, comprising:

a control knob comprising a grip portion and an electric switch;

a driving base having a lower end for pivotally mounting the driving base and an upper end, said control knob being connected to said upper end of the driving base by axially sliding said control knob over said upper end, said driving base having an integrally molded conducting flange;

connecting conductor male terminals fixed to said grip portion and extending downwardly from said grip portion, said male terminals being electrically connected to said switch; and connecting conductor female terminals fitted into said conducting flange at respective positions in alignment with said connecting conductor male terminals, said female terminals being electrically connected with a distribution cord, whereby said male terminals are inserted into said female terminals to form a completed electrical connection from said switch to said distribution cord upon axially sliding said control knob over said upper end of the driving base;

wherein said conducting flange comprises a pair of terminal insertion holes extending from an upper end surface of the conducting flange to a lower end surface of the conducting flange;

wherein said control knob comprises a lower end surface from which said male terminals extend downwardly and an internal bore extending axially within said control knob, said internal bore being open at the lower end surface of said control knob;

wherein said driving base comprises a selector lever portion extending upwardly from said conducting flange and being axially received within said internal bore of said control knob;

wherein said conducting flange comprises an upper end surface facing said lower end surface of said control knob, said conducting flange having terminal insertion holes extending through said conducting flange in a direction parallel to an axial direction of said internal bore and an axial direction of said selector lever portion, and said female terminals being secured in said terminal insertion holes, whereby said male terminals are aligned and inserted into female terminals upon sliding said control knob over said selector lever portion; and wherein said terminal insertion holes extend from said upper end surface of the conducting flange to a lower end surface of the conducting flange, each insertion hole having a cord insertion slit extending from a wall of the conducting flange between the upper and lower end surfaces to a central portion of the insertion hole, said cord insertion slits being dimensioned such that said distribution cord can be passed through said cord insertion slits during assembly.

10. The shift change lever assembly according to claim 9, wherein said female terminals each have an enlarged head portion, said enlarged head portion having a larger diameter than a diameter of said terminal insertion holes, whereby said enlarged head portions engage said upper surface of said conducting flange to prevent said female terminals from sliding therethrough.

11. The shift change lever assembly according to claim 10, wherein said upper surface of said conducting flange comprises a recessed portion for accommodating said enlarged head portions of said female terminals.

\* \* \* \* \*